(12) United States Patent
Chatterji et al.

(10) Patent No.: US 7,569,108 B2
(45) Date of Patent: Aug. 4, 2009

(54) PREVENTION OF LATEX INVERSION IN SALTWATER CEMENT COMPOSITIONS FOR USE IN SUBTERRANEAN FORMATIONS AND ASSOCIATED COMPOSITIONS

(75) Inventors: Jiten Chatterji, Duncan, OK (US); Bobby J. King, Duncan, OK (US); D. Chad Brenneis, Marlow, OK (US); Roger S. Cromwell, Walters, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 474 days.

(21) Appl. No.: 11/540,230

(22) Filed: Sep. 28, 2006

(65) Prior Publication Data

US 2008/0078307 A1 Apr. 3, 2008

(51) Int. Cl.
 *C04B 24/16* (2006.01)
(52) U.S. Cl. .................. 106/726; 106/724; 106/823
(58) Field of Classification Search ............ 106/696, 106/724, 823, 726
See application file for complete search history.

(56) References Cited

U.S. PATENT DOCUMENTS

| | | | |
|---|---|---|---|
| 4,537,918 A * | 8/1985 | Parcevaux et al. | 523/130 |
| 4,721,160 A * | 1/1988 | Parcevaux et al. | 166/293 |
| 4,767,460 A * | 8/1988 | Parcevaux et al. | 523/130 |
| 4,849,018 A * | 7/1989 | Babcock et al. | 524/4 |
| 5,135,577 A | 8/1992 | Brothers | |
| 5,159,980 A | 11/1992 | Onan et al. | |
| 5,293,938 A | 3/1994 | Onan et al. | |
| 5,588,488 A | 12/1996 | Vijn et al. | |
| 5,688,844 A | 11/1997 | Chatterji et al. | |
| 5,738,463 A | 4/1998 | Onan | |
| 5,795,924 A | 8/1998 | Chatterji et al. | |
| 5,820,670 A | 10/1998 | Chatterji et al. | |
| 5,945,387 A | 8/1999 | Chatterji et al. | |
| 5,964,293 A | 10/1999 | Chatterji et al. | |
| 6,098,711 A | 8/2000 | Chatterji et al. | |
| 6,234,251 B1 | 5/2001 | Chatterji et al. | |
| 6,271,181 B1 | 8/2001 | Chatterji et al. | |
| 6,297,202 B1 | 10/2001 | Chatterji et al. | |
| 6,328,106 B1 | 12/2001 | Griffith et al. | |
| 6,330,917 B2 | 12/2001 | Chatterji et al. | |
| 6,401,817 B1 | 6/2002 | Griffith et al. | |
| 6,417,142 B1 | 7/2002 | Chatterji et al. | |
| 6,448,206 B1 | 9/2002 | Griffith et al. | |
| 6,488,764 B2 * | 12/2002 | Westerman | 106/724 |
| 6,503,870 B2 | 1/2003 | Griffith et al. | |
| 6,508,306 B1 | 1/2003 | Reddy et al. | |
| 6,516,884 B1 | 2/2003 | Chatterji et al. | |
| 6,555,507 B2 | 4/2003 | Chatterji et al. | |
| 6,569,924 B2 | 5/2003 | Shendy et al. | |
| 6,593,402 B2 | 7/2003 | Chatterji et al. | |
| 6,641,660 B1 | 11/2003 | Chatterji et al. | |
| 6,668,928 B2 | 12/2003 | Brothers | |
| 6,722,433 B2 | 4/2004 | Brothers et al. | |
| 6,881,708 B2 | 4/2005 | Reddy et al. | |
| 6,986,392 B2 | 1/2006 | Chatterji et al. | |
| 7,022,755 B1 * | 4/2006 | Chatterji et al. | 524/8 |
| 7,077,203 B1 | 7/2006 | Roddy et al. | |
| 2003/0177954 A1 * | 9/2003 | Vijn et al. | 106/716 |
| 2005/0022990 A1 * | 2/2005 | Chatterji et al. | 166/279 |
| 2006/0032407 A1 | 2/2006 | Chatterji et al. | |
| 2006/0174805 A1 | 8/2006 | Chatterji et al. | |
| 2007/0125276 A1 * | 6/2007 | Reddy et al. | 106/689 |
| 2007/0203028 A1 | 8/2007 | Lewis et al. | 507/221 |

FOREIGN PATENT DOCUMENTS

WO WO 2007/099292 9/2007

OTHER PUBLICATIONS

U.S. Appl. No. 11/540,229, Chatterji et al., filed Sep. 28, 2006.
Office Action from U.S. Appl. No. 11/540,229, Dec. 14, 2007.
Office Action from U.S. Appl. No. 11/540,229, Aug. 9, 2007.
Halliburton brochure entitled "Cementing Latex 2000", 2006.
BASF technical bulletin entitled "Avenel S 150 CG Anionic Surfactant", 2002.
Halliburton brochure entitled "D-Air 3000™ and D-Air 3000L™", Aug. 2007.
Halliburton brochure entitled "D-Air 4000L™", Sep. 2007.
Halliburton brochure entitled "HR® -15 Cement Retarder", Aug. 2007.
Halliburton brochure entitled "HR® -601 Cement Retarder", Nov. 2007.
Halliburton brochure entitled "SSA-1™ Strength-Stabilizing Agent", Aug. 2007.
Foreign Search Report from a Related Application, Dec. 13, 2007.
Foreign Search Report from a Related Application, Jan. 25, 2008.
Notice of Allowance from U.S. Appl. No. 11/540,229, Jan. 28, 2008.
Office Action from U.S. Appl. No. 11/540,229 dated Aug. 9, 2007.
Halliburton brochure entitled "Cementing Latex 2000" dated 2006.
BASF technical bulletin entitled "Avanel S 150 CG Anionic Surfactant" dated 2002.
Chatterji, J. et al., "Prevention of Latex Inversion In Saltwater Cement Compositions For Use In Subterranean Formations and Associated Methods," filed Sep. 28, 2006 as U.S. Appl. No. 11/540,229.

* cited by examiner

*Primary Examiner*—Paul Marcantoni
(74) *Attorney, Agent, or Firm*—Craig W. Roddy; Tumey, LLP.

(57) ABSTRACT

The prevention of latex inversion in saltwater cement compositions for use in subterranean formations by inclusion of a combination of latex stabilizers and associated methods of cementing. Saltwater cement compositions comprising saltwater, a cement, a latex, a first latex stabilizer comprising a surfactant having the formula:

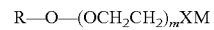

$$R-O-(OCH_2CH_2)_m XM$$

wherein R is an alkyl group having in the range of from about 10 carbons to about 20 carbons, m is an integer in the range of from about 10 to about 40, X is $OSO_3$ or $SO_3$, and M is a compatible cation, and a second latex stabilizer comprising an alcohol ether sulfate having the formula:

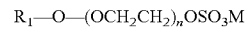

$$R_1-O-(OCH_2CH_2)_n OSO_3M$$

wherein $R_1$ is an alkyl group having in the range of from about 4 carbons to about 12 carbons, n is an integer in the range of from about 1 to about 10, and M is a compatible cation.

25 Claims, No Drawings

PREVENTION OF LATEX INVERSION IN SALTWATER CEMENT COMPOSITIONS FOR USE IN SUBTERRANEAN FORMATIONS AND ASSOCIATED COMPOSITIONS

CROSS-REFERENCE TO RELATED APPLICATIONS

The present invention is related to U.S. Pat. No. 7,363,977, entitled "Prevention of Latex Inversion in Saltwater Cement Compositions for Use in Subterranean Formations and Associated Methods," filed on the same date herewith, the entire disclosure of which is incorporated herein by reference.

BACKGROUND

The present invention relates to saltwater cement compositions and, more particularly, to the use of a combination of latex stabilizers to prevent latex inversion in saltwater cement compositions and associated cement compositions.

Cement compositions are commonly utilized in subterranean operations, particularly subterranean well construction and remedial operations. For example, in subterranean well construction, a pipe string (such as casing and liners) may be run into the well and cemented in place. The process of cementing the pipe string in place is commonly referred to as "primary cementing." In a typical primary cementing operation, a cement composition may be pumped into an annulus between the walls of a well bore and the exterior surface of the pipe string disposed therein. The cement composition sets in the annular space, thereby forming an annular sheath of hardened, substantially impermeable cement that supports and positions the pipe string in the well bore and bonds the exterior surface of the pipe string to the walls of the well bore. Among other things, the annular sheath of set cement surrounding the pipe string functions to prevent the migration of fluids in the annulus, as well as protecting the pipe string from corrosion. Cement compositions also may be used in remedial cementing operations, such as squeeze cementing and the placement of cement plugs.

Heretofore, latex has been included in cement compositions for use in subterranean formations to improve various properties of the compositions. For example, latex may be included in a cement composition for fluid loss control, to provide resiliency to the set cement, and/or to reduce the issues associated with gas channeling. In general, latex used in cement compositions is often provided as a water-in-oil emulsion containing high quantities of natural or synthetic rubber (such as styrene-butadiene rubber). These cement compositions that include latex may be prepared using either freshwater of saltwater. By way of example, when cementing in an offshore well, seawater may be used to prepare the cement composition, thereby alleviating the necessity to transport freshwater to the offshore well location. Additionally, during a subterranean cementing operation, one or more salt containing zones may be encountered. Accordingly, to alleviate potential issues associated with the cement composition dissolving salt contained in these zones, saltwater may be used to prepare the cement compositions.

However, when latex is included in saltwater cement compositions, the latex will typically invert upon combination with the saltwater resulting in precipitation of the rubber whether in the form of flocs or fine particles. As will be appreciated, this premature latex inversion may undesirably viscosity the cement composition, resulting in a cement composition that is non-functional for use in subterranean cementing operations. Moreover, because of the premature inversion, the latex generally will not have the desired functionality in the cement composition.

SUMMARY

The present invention relates to saltwater cement compositions and, more particularly, to the use of a combination of latex stabilizers to prevent latex inversion in saltwater cement compositions and associated cement compositions.

An exemplary embodiment of the present invention provides a well cement composition that comprises saltwater, a cement, a latex, a first latex stabilizer comprising a surfactant having the formula:

$$R[[-O]]-(OCH_2CH_2)_m XM$$

wherein R is an alkyl group having in the range of from about 10 carbons to about 20 carbons, m is an integer in the range of from about 10 to about 40, X is $OSO_3$ or $SO_3$, and M is a compatible cation, and a second latex stabilizer comprising an alcohol ether sulfate having the formula:

$$R_1[[-O]]-(OCH_2CH_2)_n OSO_3 M$$

wherein $R_1$ is an alkyl group having in the range of from about 4 carbons to about 12 carbons, n is an integer in the range of from about 1 to about 10, and M is a compatible cation.

Another exemplary embodiment of the present invention provides an unfoamed well cement composition that comprises saltwater, a hydraulic cement, a defoaming agent, a styrene-butadiene latex, a first latex stabilizer comprising an alcohol ether sulfonate having the formula:

$$R_2[[-O]]-(OCH_2CH_2)_o SO_3 M$$

wherein $R_2$ is an alkyl group having in the range of from about 11 carbons to about 15 carbons, o is an integer in the range of from about 15 to about 40, and M is a compatible cation, and a second latex stabilizer comprising an alcohol ether sulfate having the formula:

$$R_1[[-O]]-(OCH_2CH_2)_n OSO_3 M$$

wherein $R_1$ is an alkyl group having in the range of from about 4 carbons to about 12 carbons, n is an integer in the range of from about 1 to about 10, and M is a compatible cation.

Another exemplary embodiment of the present invention provides an unfoamed well cement composition that comprises saltwater, a hydraulic cement, a defoaming agent, a styrene-butadiene latex, a first latex stabilizer comprising an alcohol ether sulfate having the formula:

$$R_3[[-O]]-(OCH_2CH_2)_p OSO_3 M$$

wherein $R_3$ is an alkyl group having in the range of from about 10 carbons to about 16 carbons, p is an integer in the range of from about 10 to about 20, and M is a compatible cation, and second latex stabilizer comprising an alcohol ether sulfate having the formula:

$$R_1[[-O]]-(OCH_2CH_2)_n OSO_3 M$$

wherein $R_1$ is an alkyl group having in the range of from about 4 carbons to about 12 carbons, n is an integer in the range of from about 1 to about 10, and M is a compatible cation.

Another exemplary embodiment of the present invention provides a cement composition that comprises saltwater, a cement, a latex, a first latex stabilizer comprising a surfactant having the formula:

$$R[[\text{—O}]]\text{—}(OCH_2CH_2)_m XM$$

wherein R is an alkyl group having in the range of from about 10 carbons to about 20 carbons, m is an integer in the range of from about 10 to about 40, X is $OSO_3$ or $SO_3$, and M is a compatible cation, and a second latex stabilizer comprising an alcohol ether sulfate having the formula:

$$R_1[[\text{—O}]]\text{—}(OCH_2CH_2)_n OSO_3 M$$

wherein $R_1$ is an alkyl group having in the range of from about 4 carbons to about 12 carbons, n is an integer in the range of from about 1 to about 10, and M is a compatible cation.

The features and advantages of the present invention will be apparent to those skilled in the art upon reading the following description of specific embodiments.

DESCRIPTION OF SPECIFIC EMBODIMENTS

The present invention relates to saltwater cement compositions and, more particularly, to the use of a combination of latex stabilizers to prevent latex inversion in saltwater cement compositions and associated cement compositions.

In one embodiment, a saltwater cement composition comprises saltwater, a cement, a latex, a first latex stabilizer that comprises a surfactant having the formula:

$$R[[\text{—O}]]\text{—}(OCH_2CH_2)_m XM$$

wherein R is an alkyl group having in the range of from about 10 carbons to about 20 carbons, m is an integer in the range of from about 10 to about 40, X is $OSO_3$ or $SO_3$, and M is any compatible cation, and a second latex stabilizer that comprises an alcohol ether sulfate having the formula:

$$R_1[[\text{—O}]]\text{—}(OCH_2CH_2)_n OSO_3 M$$

wherein $R_1$ is an alkyl group having in the range of from about 4 carbons to about 12 carbons, n is an integer in the range of from about 1 to about 10, and M is any compatible cation.

The saltwater used in the saltwater cement compositions of the present technique generally comprises water and a salt dissolved therein. As will be appreciated by those of ordinary skill in the art, the saltwater generally may comprise a brine, seawater, or combinations thereof. Examples of suitable salts include sodium chloride, ammonium chloride, potassium chloride, and combinations thereof. The salt generally may be present in the saltwater in an amount of at least about 1% by weight of the water present in the saltwater. In some exemplary embodiments, the salt generally may be present in an amount of at least about 1%, 3%, 5%, 10%, 15%, 18%, 20%, 25%, 30%, 35%, or 37% by weight of the water present in the saltwater. For example, seawater generally has a salt concentration in the range of from about 3% to about 3.5% by weight of the water present in the seawater. In one particular embodiment, the saltwater comprises a saturated saltwater solution. By way of example, a saturated saltwater solution at 140° F. may comprise sodium chloride in an amount of about 37% by weight of the water in the saturated saltwater solution. Those of ordinary skill in the art will appreciate that the salt concentration and particular salt chosen may vary based on a number of factors. For example, certain concentrations of potassium chloride (e.g., >10%) may undesirably interact with other components of the cement composition potentially resulting in a non-functional composition.

Those of ordinary skill in the art will recognize that a portion of the water needed for forming a pumpable slurry and for cement hydration will be provided by the latex. However, additional water will generally be needed. Accordingly, the saltwater generally may be present in the saltwater cement compositions of the present technique in an amount sufficient, in combination with the latex, to form a pumpable slurry and for hydrating the cement contained therein. In some exemplary embodiments, the saltwater may be present in the saltwater cement compositions in an amount in the range of from about 26% to about 55% by weight of the cement ("bwoc").

The saltwater cement compositions of the present technique also comprise a cement. All cements suitable for use in subterranean cementing operations may be used in accordance with the exemplary embodiments of the present saltwater cement compositions. Examples of suitable cements include hydraulic cements that comprise calcium, aluminum, silicon, oxygen, and/or sulfur, which set and harden by reaction with water. Suitable hydraulic cements include Portland cements, pozzolana cements, gypsum cements, high alumina content cements, slag cements, silica cements, and combinations thereof. Examples of suitable Portland cements include those classified as Class A, C, H, and G cements according to American Petroleum Institute, API Specification for Materials and Testing for Well Cements, API Specification 10, Fifth Ed., Jul. 1, 1990.

The saltwater cement compositions of the present technique also comprise a latex. As will be understood by those skilled in the art, the latex may comprise any of a variety of rubber materials that are commercially available in latex form. Suitable rubber materials include natural rubber (cis-1, 4-polyisoprene), modified natural rubber, synthetic rubber, and combinations thereof. Synthetic rubber of various types may be utilized, including ethylene-propylene rubbers, styrene-butadiene rubbers, nitrite rubbers, nitrite butadiene rubbers, butyl rubber, neoprene rubber, polybutadiene rubbers, acrylonitrile-styrene-butadiene rubber, polyisoprene rubber, and combinations thereof. Those of ordinary skill in the art will appreciate that other types of synthetic rubber are also encompassed within the present technique.

In one exemplary embodiment, the latex comprises a water-in-oil emulsion that comprises styrene-butadiene rubber. As will be appreciated, the aqueous phase of the emulsion comprises an aqueous colloidal dispersion of the styrene-butadiene copolymer. Moreover, in addition to the dispersed styrene-butadiene copolymer, the emulsion may comprise water in the range of from about 40% to about 70% by weight of the emulsion and small quantities of an emulsifier, polymerization catalysts, chain modifying agents, and the like. As will be appreciated, styrene-butadiene latex is often produced as a terpolymer emulsion that may include a third monomer to assist in stabilizing the emulsion. Non-ionic groups which exhibit stearic effects and which contain long ethoxylate or hydrocarbon tails may also be present.

The weight ratio of the styrene to butadiene in the latex can range from about 10:90 to about 90:10. In some embodiments, the weight ratio of the styrene to butadiene in the emulsion may range from about 20:80 to about 80:20. An example of a suitable styrene-butadiene latex has a styrene-to-butadiene weight ratio of about 25:75 and comprises water in an amount of about 50% by weight of the emulsion. Such a styrene-butadiene latex is available from Halliburton Energy Services, Duncan, Okla., under the name Latex 2000™ cement additive. Another example of a suitable styrene-butadiene latex has a styrene-to-butadiene weight ratio of about 30:70.

The latex is generally provided in the saltwater cement compositions of the present technique in an amount sufficient for the desired application. In some exemplary embodiments, the latex may be included in the saltwater cement compositions in an amount in the range of from about 8% to about 45% bwoc. In some exemplary embodiments, the latex may be included in the saltwater cement compositions in an amount in the range of from about 8% to about 27% bwoc. In one particular exemplary embodiment, the latex may be present in an amount of about 19% bwoc.

Those of ordinary skill in the art will appreciate that when latex is combined with saltwater, the latex generally inverts resulting in precipitation of the rubber. By way of example, rubber may precipitate in the form of flocs or fine particles upon mixture of the latex with the saltwater. As will be appreciated, this premature latex inversion may result in a cement composition that is non-functional for use in subterranean cementing operations, for example, due to undesirable viscosification. It has now been recognized that the combination of the below described latex stabilizers serves to prevent this premature latex inversion so that embodiments of the present saltwater cement compositions containing latex may be prepared and used in subterranean operations.

The first latex stabilizer utilized in accordance with the present technique comprises a surfactant having the formula:

$$R[[-O]]-(OCH_2CH_2)_m XM$$

wherein R is an alkyl group having in the range of from about 10 carbons to about 20 carbons, m is an integer in the range of from about 10 to about 40, X is $OSO_3$ or $SO_3$, and M is any compatible cation, such as sodium or ammonium. Alkyl groups having 11 carbons, 12 carbons, 13 carbons, 14 carbons, 15 carbons, 16 carbons, 17 carbons, 18 carbons, and 19 carbons are also contemplated herein. For example, the surfactant may have an alkyl group having in the range of from about 11 carbons to about 15 carbons. In another exemplary embodiment, the surfactant may have an alkyl group having in the range of from about 10 carbons to about 16 carbons. As will be recognized, m represents the moles of ethylene oxide present in the surfactant, which may include or range from 10 moles, 15 moles, 20 moles, 25 moles, 30 moles, 35 moles, or 40 moles of ethylene oxide. For example, the surfactant may include from 10 moles to 20 moles of ethylene oxide. In one exemplary embodiment, the surfactant may include 15 moles of ethylene oxide. In another exemplary embodiment, the surfactant may include 12 moles of ethylene oxide.

By way of example, a suitable first latex stabilizer comprises an alcohol ether sulfonate having the formula:

$$R_2[[-O]]-(OCH_2CH_2)_o SO_3 M$$

wherein $R_2$ is an alkyl group having in the range of from about 11 carbons to about 15 carbons, o is an integer in the range of from about 15 to about 40, and M is any compatible cation, such as sodium or ammonium. In one exemplary embodiment, a suitable alcohol ether sulfonate is a sodium salt derived by reacting a $C_{11}$ to $C_{15}$ alcohol with about 15 moles of ethylene oxide and has the formula:

$$H(CH_2)_{11-15}[[-O]]-(OCH_2CH_2)_{15} SO_3 Na$$

which is available from BASF Corp., Mount Olive, N.J., under the name AVANEL® S 150 CG surfactant.

By way of example, another suitable first latex stabilizer comprises an alcohol ether sulfate having the formula:

$$R_3[[-O]]-(OCH_2CH_2)_p OSO_3 M$$

wherein R is an alkyl group having in the range of from about 10 carbons to about 16 carbons, p is an integer in the range of from about 10 to about 20, and M is any compatible cation, such as sodium or ammonium. In one exemplary embodiment, a suitable alcohol ether sulfate is a sodium salt derived by reacting a $C_{12}$ alcohol with about 12 moles of ethylene oxide and has the formula:

$$H(CH_2)_{12}[[-O]]-(OCH_2CH_2)_{12} SO_3 Na$$

which is available from ARC Products, Inc., Dallas, Tex.

The first latex stabilizer is generally included in the saltwater cement compositions of the present technique in an amount sufficient to provide the desired stabilization. For example, the first latex stabilizer may be present in the saltwater cement composition in an amount in the range of from about 0.01 gallons to about 0.5 gallons per gallon of the latex. In further exemplary embodiments, the first latex stabilizer may be present in an amount in an amount including or ranging from 0.01, 0.05, 0.1, 0.2, 0.3, 0.4, or 0.5 gallons per gallon of the latex. By way of example, the first latex stabilizer may be present in an amount in the range of from about 0.1 gallons to about 0.35 gallons per gallon of the latex. In one particular embodiment, the first latex stabilizer may be present in an amount of about 0.35 gallons per gallon of the latex The saltwater cement compositions of the present technique also include a second latex stabilizer that comprises an alcohol ether sulfate having the formula:

$$R_1[[-O]]-(OCH_2CH_2)_n OSO_3 M$$

wherein $R_1$ is an alkyl group having in the range of from about 4 carbons to about 12 carbons, n is an integer in the range of from about 1 to about 10, and M is any compatible cation, such as sodium or ammonium. Alkyl groups having from 5 carbons, 6 carbons, 7 carbons, 8 carbons, 9 carbons, 10 carbons, or 11 carbons are also contemplated herein. For example, the alcohol ether sulfate may have an alkyl group having in the range of from about 8 to about 10 carbons. As will be recognized, n represents the moles of ethylene oxide present in the alcohol ether sulfate, which may include or range from 1 mole, 2 moles, 3 moles, 4 moles, 5 moles, 6 moles, 7 moles, 8 moles, 9 moles, or 10 moles of ethylene oxide. For example, the alcohol ether sulfate may include from about 2 moles to about 4 moles of ethylene oxide. In one exemplary embodiment, the second latex stabilizer may include 3 moles of ethylene oxide.

In one particular exemplary embodiment, a suitable alcohol ether sulfate is a sodium salt derived by reacting a $C_8$ to $C_{10}$ alcohol with about 3 moles of ethylene oxide and has the formula:

$$H(CH_2)_{8-10}[[-O]]-(OCH_2CH_2)_3 OSO_3 Na$$

which is available from Chemron Corp., Paso Robles, Calif., under the name Sulfochem™ 247H.

The second latex stabilizer is generally included in the saltwater cement composition in an amount sufficient to provide the desired stabilization. For example, the second latex stabilizer may be present in the saltwater cement composition in an amount in the range of from about 0.01 gallons to about 0.1 gallons per gallon of the latex. In further embodiments, the second latex stabilizer may be present in an amount in an amount including or ranging from 0.01, 0.02, 0.03, 0.04, 0.05, 0.06, 0.07, 0.08, 0.09, or 0.1 gallons per gallon of the latex. In some exemplary embodiments, the second latex stabilizer may be present in an amount in the range of from about 0.05 gallons to about 0.1 gallons per gallons of the latex. In one exemplary embodiment, the second latex stabilizer may be present in an amount of about 0.075 gallons per gallon of the latex.

Optionally, exemplary embodiments of the present saltwater cement compositions may comprise a defoaming agent to prevent foaming during the mixing of the cement composition. Certain embodiments of the saltwater cement compositions may foam during mixing because the surfactants present as emulsifiers in the latex, as well as the first and the second latex stabilizers, may facilitate foaming during the mixing of the saltwater cement composition. The defoaming agent may comprise any of a variety of compounds suitable for use as defoamers. Examples of suitable compounds that may be included in the defoaming agent include a mixture of polypropylene glycol, an internal olefin and activated silica. An example of a suitable defoaming agent is D-AIR 3000L™ defoamer, which is available from Halliburton Energy Services, Inc., Duncan, Okla. Another example of a suitable defoaming agent is D-AIR 4000L™ defoamer, which is also available from Halliburton Energy Services, Inc. As will be appreciated, where used, the defoaming agent may be included in the saltwater cement composition in an amount sufficient to provide the desired foaming prevention. By way of example, the defoaming agent may be present in an amount in the range of from about 0.05% to about 1% bwoc.

Other additives suitable for use in subterranean cementing operations also may be added to these compositions, including dispersing agents, retardants, accelerators, weighting agents, vitrified shale, lightweight additives, and combinations thereof. A person having ordinary skill in the art, with the benefit of this disclosure, will know the type and amount of additive useful for a particular application and desired result.

Typically, the present saltwater cement compositions may have a density suitable for a particular application. By way of example, the saltwater cement compositions may have a density in the range of from about 13 pounds per gallon ("ppg") to about 18 ppg. In certain exemplary embodiments, the saltwater cement compositions may have a density in the range of from about 15 ppg to about 17 ppg.

The saltwater cement compositions of the present technique may be prepared in accordance with any suitable technique. By way of example, saltwater may be introduced into a cement blender. Thereafter, in certain exemplary embodiments, the defoaming agent, the latex stabilizers, and the latex may then be sequentially added to the cement mixer with suitable agitation to disperse the constituents. In one particular embodiment, the latex stabilizers may be added to the cement mixer simultaneously or sequentially. Other liquid additives may then be admixed followed by the cement and other dry solid additives. The resulting mixture may then be agitated for a sufficient amount of time to admix the components and form a pumpable saltwater cement composition.

As will be appreciated by those of ordinary skill in the art, the saltwater cement compositions of the present technique may be used in a variety of subterranean applications, including primary cementing and remedial cementing. For example, in exemplary primary cementing applications, the saltwater cement compositions may be introduced into an annulus between a pipe string located in a subterranean formation and the subterranean formation, and allowed to set therein. In addition, in exemplary remedial cementing applications, the saltwater cement compositions may used, for example, in squeeze cementing operations or in the placement of cement plugs. In exemplary squeeze cementing embodiments, hydraulic pressure may be applied to the saltwater cement composition to force (squeeze) the composition into a desired location in a subterranean formation, such as the porosity of a subterranean formation, a formation void, perforations in a pipe string, voids (e.g., holes and cracks) in a cement sheath, and the like. Moreover, these saltwater cement compositions also may be used in surface applications, such as construction cementing.

In one particular exemplary embodiment, a saltwater cement composition may be introduced into a selected location and allowed to set therein. As will be appreciated, the selected location may be any suitable location above ground or in a subterranean formation where it is desired for the saltwater cement composition to set into a hardened mass. For example, the selected location may be an annulus between a pipe string located in a subterranean formation and the subterranean formation. The saltwater cement composition generally comprises saltwater, a cement, a latex, a first latex stabilizer that comprises a surfactant having the formula:

wherein R is an alkyl group having in the range of from about 10 carbons to about 20 carbons, m is an integer in the range of from about 10 to about 40, X is $OSO_3$ or $SO_3$, and M is any compatible cation, and a second latex stabilizer that comprises an alcohol ether sulfate having the formula:

wherein $R_1$ is an alkyl group having in the range of from about 4 carbons to about 12 carbons, n is an integer in the range of from about 1 to about 10, and M is any compatible cation.

To facilitate a better understanding of the present technique, the following examples of some specific embodiments are given. In no way should the following examples be read to limit, or to define, the scope of the invention.

EXAMPLE 1

The stabilizing properties of the first latex stabilizer were tested in saltwater cement compositions. Accordingly, sample saltwater cement compositions were prepared that had a density of about 16 ppg and that comprised saltwater, Portland class H cement, latex, and the first latex stabilizer. For Sample Nos. 1, 3, 5, and 7, the first latex stabilizer comprised a $C_{11-15}$ alcohol ether sulfonate with 15 moles of ethylene oxide. For Samples Nos. 2, 4, 6, and 8, the first latex stabilizer comprised a $C_{12}$ alcohol ether sulfate with 12 moles of ethylene oxide. The second latex stabilizer was not included in these sample compositions. Descriptions of these sample compositions and the stabilization properties of the first latex stabilizer are set forth in the table below.

As used in these examples, "% by w/w" refers to the percent of sodium chloride by weight of water present in the saltwater. As used in these examples, "gallons per sack" or "gal/sack" refers to gallons of the component per 94 pound sack of cement.

TABLE 1

Prevention of Latex Inversion in Saltwater with the First Latex Stabilizer

| Sample No. | NaCl (% by w/w) | 30:70 SBR Latex (gal/sack)[1] | 25:75 SBR Latex (gal/sack)[2] | First Latex Stabilizer (gal/sack) | Observation |
|---|---|---|---|---|---|
| 1 | 3 | — | 3 | 0.15[3] | Latex inverted upon mixing |

TABLE 1-continued

Prevention of Latex Inversion in Saltwater with the First Latex Stabilizer

| Sample No. | NaCl (% by w/w) | 30:70 SBR Latex (gal/sack)[1] | 25:75 SBR Latex (gal/sack)[2] | First Latex Stabilizer (gal/sack) | Observation |
|---|---|---|---|---|---|
| 2 | 3 | — | 3 | 0.15[4] | Latex inverted upon mixing |
| 3 | 3 | — | 2 | 0.3[3] | Latex inverted after mixing |
| 4 | 3 | — | 2 | 0.3[4] | Latex inverted after mixing |
| 5 | 5 | 3 | — | 0.15[3] | Latex inverted upon mixing |
| 6 | 5 | 3 | — | 0.15[4] | Latex inverted upon mixing |
| 7 | 5 | 2 | — | 0.15[3] | Latex inverted upon mixing |
| 8 | 5 | 2 | — | 0.15[4] | Latex inverted upon mixing |

[1]Styrene-butadiene latex (30%:70% by wt).
[2]Styrene-butadiene latex (25%:75% by wt) (Latex 2000 ™ Cement Additive from Halliburton Energy Services, Inc.).
[3]$C_{11-15}$ alcohol ether sulfonate with 15 moles of ethylene oxide (Avanel ® S 150 CG surfactant from BASF Corp.).
[4]$C_{12}$ alcohol ether sulfate with 12 moles of ethylene oxide (from ARC Products, Inc.).

From Table 1, it can be seen that the first latex stabilizer ($C_{11-15}$ alcohol ether sulfonate with 15 moles of ethylene oxide or $C_{12}$ alcohol ether sulfate with 12 moles of ethylene oxide) did not prevent the latex from prematurely inverting when mixed with the saltwater. That is, the styrene-butadiene latex (25%:75% by weight) inverted in a 3% by weight saltwater solution upon mixing. The styrene-butadiene latex (30%:70% by weight) inverted in a 5% by weight saltwater solution upon mixing. Moreover, for Sample Nos. 3 and 4, the styrene-butadiene latex (25%:75% by weight) inverted shortly after mixed when the sample was placed into an atmospheric consistometer.

EXAMPLE 2

The stabilizing properties of the second latex stabilizer were tested in saltwater cement compositions. Accordingly, sample saltwater cement compositions were prepared that had a density of about 16 ppg and that comprised saltwater, Portland class H cement, latex, and the second latex stabilizer. For this series of tests, the second latex stabilizer comprised a $C_{8-10}$ alcohol ether sulfate with 3 moles of ethylene oxide. The first latex stabilizer was not included in these sample compositions. Descriptions of these sample compositions and the stabilization properties of the second latex stabilizer are set forth in the table below.

TABLE 2

Prevention of Latex Inversion in Saltwater with the Second Latex Stabilizer

| Sample No. | NaCl (% by w/w) | 30:70 SBR Latex (gal/sack)[1] | 25:75 SBR Latex (gal/sack)[2] | Second Latex Stabilizer (gal/sack)[3] | Observation |
|---|---|---|---|---|---|
| 9 | 3 | — | 3 | 0.075 | Latex inverted upon mixing |
| 10 | 5 | 3 | — | 0.075 | Latex inverted upon mixing |

[1]Styrene-butadiene latex (30%:70% by wt).
[2]Styrene-butadiene latex (25%:75% by wt) (Latex 2000 ™ Cement Additive from Halliburton Energy Services, Inc.).
[3]$C_{8-10}$ alcohol ether sulfate with 3 moles of ethylene oxide (Sulfochem ™ 247H from Chemron Corp.).

From Table 2, it can be seen that the second latex stabilizer ($C_{8-10}$ alcohol ether sulfate with 3 moles of ethylene oxide) did not prevent the latex from prematurely inverting when mixed with the saltwater. That is, the styrene-butadiene latex (25%:75% by weight) inverted in a 3% by weight saltwater solution upon mixing, and the styrene-butadiene latex (30%:70% by weight) inverted in a 5% by weight saltwater solution upon mixing.

EXAMPLE 3

The stabilizing properties of the combination of the first and the second latex stabilizers were tested in saltwater cement compositions. Accordingly, a series of sample saltwater cement compositions were prepared that had a density of about 16 ppg and that comprised saltwater, Portland class H cement, latex, the first latex stabilizer, and the second latex stabilizer. Various additives were also included in the saltwater cement compositions, including defoaming agents, set retarders, and dispersants. For this series of tests, the first latex stabilizer comprised a $C_{11-15}$ alcohol ether sulfonate with 15 moles of ethylene oxide, and the second latex stabilizer comprised a $C_{8-10}$ alcohol ether sulfate with 3 moles of ethylene oxide. As a control, Sample No. 11 was prepared with freshwater rather than saltwater.

After preparation, the series of sample saltwater cement compositions were subjected to 72-hour compressive strength tests at 290° F., thickening time tests at 200° F., and fluid loss tests at 190° F., in accordance with API Specification 10. The results of these tests are set forth in the table below.

TABLE 3

Stabilization of Latex in Saltwater with Combinations of Latex Stabilizers

| Sample No. | NaCl (% by w/w) | 30:70 SBR Latex (gal/sack)[1] | 25:75 SBR Latex (gal/sack)[2] | First Latex Stabilizer (gal/sack)[3] | Second Latex Stabilizer (gal/sack)[4] | Defoaming Agent (gal/sack)[5] | Set Retarder (bwoc)[6] | Dispersant (gal/sack)[7] | Thickening Time to 70 BC at 200° F. (hr:min) | 72-Hour Compressive Strength at 290° F. (psi) | API Fluid Loss (cc/30 min) |
|---|---|---|---|---|---|---|---|---|---|---|---|
| 11 | — | — | 2 | 0.3 | 0.075 | 0.05 | 0.4 | 0.04 | 4:17 | 974 | 54 |
| 12 | 10 | — | 2 | 0.3 | 0.075 | 0.05 | 0.4 | 0.04 | 4:11 | 1353 | 50 |

TABLE 3-continued

Stabilization of Latex in Saltwater with Combinations of Latex Stabilizers

| Sample No. | NaCl (% by w/w) | 30:70 SBR Latex (gal/sack)[1] | 25:75 SBR Latex (gal/sack)[2] | First Latex Stabilizer (gal/sack)[3] | Second Latex Stabilizer (gal/sack)[4] | Defoaming Agent (gal/sack)[5] | Set Retarder (bwoc)[6] | Dispersant (gal/sack)[7] | Thickening Time to 70 BC at 200° F. (hr:min) | 72-Hour Compressive Strength at 290° F. (psi) | API Fluid Loss (cc/30 min) |
|---|---|---|---|---|---|---|---|---|---|---|---|
| 13 | 18 | — | 2 | 0.3 | 0.075 | 0.05 | 0.4 | 0.04 | 2:39 | 1582 | 56 |
| 14 | 37 | 2 | — | 0.3 | 0.075 | 0.05 | — | 0.04 | 2:22 | 62.1 | n/a[8] |

[1]Styrene-butadiene latex (30%:70% by wt).
[2]Styrene-butadiene latex (25%:75% by wt) (Latex 2000 ™ Cement Additive from Halliburton Energy Services, Inc.).
[3]$C_{11-15}$ alcohol ether sulfonate with 15 moles of ethylene oxide (Avanel ® S 150 CG surfactant from BASF Corp.).
[4]$C_{8-10}$ alcohol ether sulfate with 3 moles of ethylene oxide (Sulfochem ™ 247H from Chemron Corp.).
[5]D-Air 3000L ™ defoamer from Halliburton Energy Services, Inc.
[6]A mixture of a kraft lignin, a bisulfite lignin, and xylose sugar (HR-601 ™ cement retarder from Halliburton Energy Services, Inc.).
[7]A condensation product a sodium salt of naphthalene sulfonic acid and formaldehyde (CFR-2L ™ cement dispersant from Halliburton Energy Services, Inc.).
[8]Sample No. 14 gelled due to premature inversion of latex, resulting in a non-functional composition.

From Table 3, it can be seen that the combination of the first latex stabilizer ($C_{11-15}$ alcohol ether sulfonate with 15 moles of ethylene oxide) and the second latex stabilizer ($C_{8-10}$ alcohol ether sulfate with 3 moles of ethylene oxide) provided a functional saltwater cement composition in saltwater having up to 18% sodium chloride by weight of water. It is believed that the set retarder, dispersant, and defoaming agent are not prerequisites for the combination of the latex stabilizers to perform. For example, the combination of the latex stabilizers should stabilize the latex in saltwater without the need for the set retarder, dispersant, and the defoaming agent.

EXAMPLE 4

To further test the stabilizing properties of the combination of latex stabilizers, additional sample saltwater cement compositions were prepared. These sample saltwater cement compositions had a density of about 16 ppg and comprised saltwater, Portland class H cement, latex, the first latex stabilizer, and the second latex stabilizer. Various additives were also included in the saltwater cement compositions, including defoaming agents, set retarders, dispersants, and strength stabilization agents. For this series of tests, the first latex stabilizer comprised a $C_{12}$ alcohol ether sulfate with 12 moles of ethylene oxide, and the second latex stabilizer comprised a $C_{8-10}$ alcohol ether sulfate with 3 moles of ethylene oxide. As a control, Sample Nos. 15 and 18 were prepared with freshwater rather than saltwater.

After preparation, the series of sample saltwater cement compositions were subjected to 72-hour compressive strength tests at 290° F., thickening time tests at 250° F., and fluid loss tests at 190° F., in accordance with API Specification 10. The results of these tests are set forth in the table below.

TABLE 4

Stabilization of Latex in Saltwater with Combinations of Latex Stabilizers

| Sample No. | NaCl (% by w/w) | 30:70 SBR Latex (gal/sack)[1] | 25:75 SBR Latex (gal/sack)[2] | First Latex Stabilizer (gal/sack)[3] | Second Latex Stabilizer (gal/sack)[4] | Defoaming Agent (gal/sack)[5] | Set Retarder (bwoc) | Disp. (gal/sack)[8] | Strength Stab. Agent (bwoc)[9] | Thick. Time to 70 BC at 250° F. (hr:min) | 72-Hour Comp. Strength at 290° F. (psi) | API Fluid Loss (cc/30 min) |
|---|---|---|---|---|---|---|---|---|---|---|---|---|
| 15 | — | — | 2 | 0.3 | 0.075 | 0.1 | 0.2[6] | 0.04 | 35 | 1:00 | 2690 | 44 |
| 16 | 10 | — | 2 | 0.3 | 0.075 | 0.1 | 0.2[6] | 0.04 | 35 | 3:22 | 3780 | 70 |
| 17 | 18 | — | 2 | 0.3 | 0.075 | 0.1 | 0.2[6] | 0.04 | 35 | 4:22 | 3700 | 78 |
| 18 | — | 2 | — | 0.3 | 0.075 | 0.1 | 0.5[7] | 0.04 | 35 | 3:30 | 5400 | 84 |
| 19 | 10 | 2 | — | 0.3 | 0.075 | 0.1 | 0.5[7] | 0.04 | 35 | 2:30 | 4170 | 105 |
| 20 | 18 | 2 | — | 0.3 | 0.075 | 0.1 | 0.5[7] | 0.04 | 35 | 1:29 | 3800 | 114 |
| 21 | 37 | 2 | — | 0.3 | 0.075 | 0.1 | 0.05[6] | 0.04 | 35 | 4:09 | 2510 | 30 |

[1]Styrene-butadiene latex (30%:70% by wt).
[2]Styrene-butadiene latex (25%:75% by wt) (Latex 2000 ™ Cement Additive from Halliburton Energy Services, Inc.).
[3]$C_{12}$ alcohol ether sulfate with 12 moles of ethylene oxide (from Arc Products, Inc.).
[4]$C_{8-10}$ alcohol ether sulfate with 3 moles of ethylene oxide (Sulfochem ™ 247H from Chemron Corp.).
[5]D-Air 3000L ™ defoamer from Halliburton Energy Services, Inc.
[6]A mixture of a kraft lignin, a bisulfite lignin, and xylose sugar (HR-601 ™ cement retarder from Halliburton Energy Services, Inc.).
[7]A mixture of a sulfonated lignin and tartaric acid (HR-15 ™ cement retarder from Halliburton Energy Services, Inc.).
[8]A condensation product a sodium salt of naphthalene sulfonic acid and formaldehyde (CFR-2L ™ cement dispersant from Halliburton Energy Services, Inc.).
[9]Crystalline silica (SSA-1 ™ cement additive from Halliburton Energy Services, Inc.).

From Table 4, it can be seen that the combination of the first latex stabilizer ($C_{12}$ alcohol ether sulfate with 12 moles of ethylene oxide) and the second latex stabilizer ($C_{8-10}$ alcohol ether sulfate with 3 moles of ethylene oxide) can provide a functional saltwater cement composition in up to a saturated saltwater solution (37% sodium chloride by weight of water). It is believed that the set retarder, the dispersant, the defoaming agent, and the strength stabilization agent are not prerequisites for the combination of the latex stabilizers to perform. For example, the combination of the latex stabilizers should stabilize the latex in saltwater without the need for the set retarder, the dispersant, the defoaming agent, and the strength stabilization agent.

Therefore, the present invention is well adapted to attain the ends and advantages mentioned as well as those that are inherent therein. The particular embodiments disclosed above are illustrative only, as the present invention may be susceptible to various modifications and alternative forms. However, it should be understood that the invention is not intended to be limited to the particular embodiments disclosed. Rather, the present invention is to cover all modifications, equivalents, and alternatives falling within the scope and spirit of the present invention as defined by the following appended claims.

What is claimed is:

1. A well cement composition, comprising:
   saltwater;
   a cement;
   a latex;
   a first latex stabilizer comprising a surfactant having the formula:

$$R[[-O]]-(OCH_2CH_2)_m XM$$

wherein R is an alkyl group having in the range of from about 10 carbons to about 20 carbons, m is an integer in the range of from about 10 to about 40, X is $OSO_3$ or $SO_3$, and M is a compatible cation; and
   a second latex stabilizer comprising an alcohol ether sulfate having the formula:

$$R_1-(OCH_2CH_2)_n OSO_3 M$$

wherein $R_1$ is an alkyl group having in the range of from about 4 carbons to about 12 carbons, n is an integer in the range of from about 1 to about 10, and M is a compatible cation.

2. The well cement composition of claim 1, wherein the saltwater comprises a saturated saltwater solution.

3. The well cement composition of claim 1, wherein the saltwater comprises seawater.

4. The well cement composition of claim 1, wherein the saltwater comprises salt in an amount of at least about 18% by weight of water present in the saltwater.

5. The well cement composition of claim 1, wherein the saltwater cement composition has a density in the range of from about 13 pounds per gallon to about 18 pounds per gallon.

6. The well cement composition of claim 1, wherein the cement comprises a hydraulic cement.

7. The well cement composition of claim 1, wherein the latex comprises a water-in-oil emulsion comprising styrene-butadiene rubber.

8. The well cement composition of claim 1, wherein R is an alkyl group having in the range of from about 11 carbons to about 15 carbons, X is $SO_3$, and m is an integer in the range of from about 15 to about 40.

9. The well cement composition of claim 1, wherein R is an alkyl group having in the range of from about 11 carbons to about 15 carbons, X is $SO_3$, m is 15, and M is a sodium cation.

10. The well cement composition of claim 1, wherein R is an alkyl group having in the range of from about 10 carbons to about 16 carbons, X is $OSO_3$, and m is an integer in the range of from about 10 to about 20.

11. The well cement composition of claim 1, wherein R is an alkyl group having 12 carbons, X is $OSO_3$, m is 12, and M is a sodium cation.

12. The well cement composition of claim 1, wherein $R_1$ is an alkyl group having in the range of from about 8 carbons to about 12 carbons, n is 3, and M is a sodium cation.

13. The well cement composition of claim 1, wherein the first latex stabilizer is present in the saltwater cement composition in an amount in the range of from about 0.1 gallons to about 0.35 gallons per gallon of the latex, and wherein the second latex stabilizer is present in the saltwater cement composition in an amount in the range of from about 0.01 gallons to about 0.1 gallons per gallon of the latex.

14. The well cement composition of claim 1, wherein the saltwater cement composition is an unfoamed cement composition comprising a defoaming agent.

15. An unfoamed well cement composition, comprising:
    saltwater;
    a hydraulic cement;
    a defoaming agent;
    a styrene-butadiene latex,
    a first latex stabilizer comprising an alcohol ether sulfonate having the formula:

$$R_2[[-O]]-(OCH_2CH_2)_o SO_3 M$$

wherein $R_2$ is an alkyl group having in the range of from about 11 carbons to about 15 carbons, o is an integer in the range of from about 15 to about 40, and M is a compatible cation; and
    a second latex stabilizer comprising an alcohol ether sulfate having the formula:

$$R_1[[-O]]-(OCH_2CH_2)_n OSO_3^- M^+$$

wherein $R_1$ is an alkyl group having in the range of from about 4 carbons to about 12 carbons, n is an integer in the range of from about 1 to about 10, and M is a compatible cation.

16. The unfoamed well cement composition of claim 15, wherein the saltwater comprises at least about 3% salt by weight of water present in the saltwater.

17. The unfoamed well cement composition of claim 15, wherein $R_2$ is an alkyl group having in the range of from about 11 carbons to about 15 carbons, o is 15, and M is a sodium cation.

18. The unfoamed cement composition of claim 15, wherein $R_1$ is an alkyl group having in the range of from about 8 carbons to about 12 carbons, n is 3, and M is a sodium cation.

19. The unfoamed well cement composition of claim 15, wherein the first latex stabilizer is present in the saltwater cement composition in an amount in the range of from about 0.1 gallons to about 0.35 gallons per gallon of the latex, and wherein the second latex stabilizer is present in the saltwater cement composition in an amount in the range of from about 0.01 gallons to about 0.1 gallons per gallon of the latex.

20. An unfoamed well cement composition, comprising:
    saltwater;
    a hydraulic cement;
    a defoaming agent;
    a styrene-butadiene latex;
    a first latex stabilizer comprising an alcohol ether sulfate having the formula:

$$R_3[[-O]]-(OCH_2CH_2)_p OSO_3 M$$

wherein $R_3$ is an alkyl group having in the range of from about 10 carbons to about 16 carbons, p is an integer in the range of from about 10 to about 20, and M is a compatible cation; and a second latex stabilizer comprising an alcohol ether sulfate having the formula:

$$R_1[[-O]]-(OCH_2CH_2)_n OSO_3 M$$

wherein $R_1$ is an alkyl group having in the range of from about 4 carbons to about 12 carbons, n is an integer in the range of from about 1 to about 10, and M is a compatible cation.

21. The unfoamed well cement composition of claim 20, wherein the saltwater comprises at least about 5% salt by weight of water present in the saltwater.

22. The unfoamed well cement composition of claim 20, wherein $R_3$ is an alkyl group having 12 carbons, p is 12, and M is a sodium cation.

23. The unfoamed well cement composition of claim 20, wherein $R_1$ is an alkyl group having in the range of from about 8 carbons to about 12 carbons, n is 3, and M is a sodium cation.

24. The unfoamed well cement composition of claim 20, wherein the first latex stabilizer is present in the saltwater cement composition in an amount in the range of from about 0.1 gallons to about 0.35 gallons per gallon of the latex, and wherein the second latex stabilizer is present in the saltwater cement composition in an amount in the range of from about 0.01 gallons to about 0.1 gallons per gallon of the latex.

25. A cement composition, comprising:
saltwater;
a cement;
a latex;
a first latex stabilizer comprising a surfactant having the formula:

$$R[[-O]]-(OCH_2CH_2)_m XM$$

wherein R is an alkyl group having in the range of from about 11 carbons to about 15 carbons, m is an integer in the range of from about 10 to about 40, X is $SO_3$, and M is a compatible cation; and a second latex stabilizer comprising an alcohol ether sulfate having the formula:

$$R_1[[-O]]-(OCH_2CH_2)_n OSO_3 M$$

wherein $R_1$ is an alkyl group having in the range of from about 8 carbons to about 12 carbons, n is an integer in the range of from about 1 to about 10, and M is a compatible cation.

* * * * *